July 17, 1956  F. C. ROCK ET AL  2,754,718
PRISM ASSEMBLY AND METHOD OF MANUFACTURE
Filed July 14, 1953

Inventors
Frank C. Rock
Alfred E. Mann
by Roberts, Cushman & Grover
attys.

United States Patent Office 2,754,718
Patented July 17, 1956

2,754,718

PRISM ASSEMBLY AND METHOD OF MANUFACTURE

Frank C. Rock, Los Angeles, and Alfred E. Mann, North Hollywood, Calif., assignors to Technicolor Motion Picture Corporation, Hollywood, Calif., a corporation of Maine Application July 14, 1953, Serial No. 367,822

2 Claims. (Cl. 88—1)

This invention relates to X-type prism assemblies comprising four prisms, generally triangular in shape, which are cemented together along two intersecting planes with their apexes at the intersection of the planes and with their opposed faces cemented together. Usually the faces are coated before they are cemented together, as for example with interference layers or partial reflecting coatings. Heretofore no satisfactory way has been found to make such prism assemblies. Even with elaborate jigs it has been very difficult to secure the prisms together in accurate alignment. Another difficulty is that in solidifying the cement has tended to "feather," that is become unevenly distorted and break, thereby causing distortion of the transmitted light and aberrations in the resulting images. This is particularly serious when the opposed faces of the prisms are coated before being joined together, especially in the case of thin multi-layer interference coatings, because the stresses in the cement layers damage the coatings.

Objects of the present invention are to overcome the prior difficulties and to produce an assembly in which the prisms are accurately aligned and in which the cement, and intermediate coatings if any, do not become distorted in the process of manufacture.

According to the present invention the prisms are cemented together in two pairs with the uncemented faces of each pair in alignment and then, after the cement has set, the two pairs are cemented together with the first cemented faces in alignment. By first cementing the prisms in two pairs, the two prisms of each pair may be accurately aligned by placing them on an optical flat surface while the cement is setting; and by allowing the cement in one plane to set before the faces in the other plane are cemented together, the aforesaid "feathering" and distortion is eliminated.

In a more specific aspect the invention involves first coating two of the prism faces which are to be assembled in alignment in one of the aforesaid planes, cementing each of the coated faces to the corresponding faces of the other two prisms to form two pairs of prisms with the uncoated faces of each pair in alignment, after the cement has set coating the uncoated faces of one of the pairs, and then cementing the two pairs together with the first coated faces in alignment. In the preferred embodiment certain of the faces are coated with thin multiple-layer interference coatings before they are cemented together.

For the purpose of illustration a typical embodiment of the invention is shown in the accompanying drawings in which Fig. 1 is an exploded view of four prisms to be assembled together;

Figure 2:
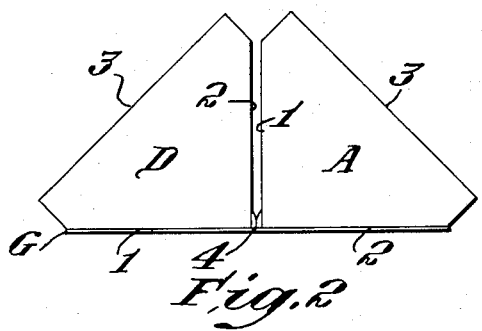
Fig. 2 illustrates the step of coating two of the prism faces which are to be assembled in alignment in one of the aforesaid planes.

In the illustration the four prisms are designated A, B, C and D and the corresponding faces of each of the prisms are designated as 1, 2 and 3. As shown in Fig. 2 the prisms A and D are positioned with their faces A2 and D1 in alignment preparatory to the application of a coating G to these two faces. Before the coating is applied the gap between the two prisms is sealed with a soluble mask 4 as disclosed in the co-pending application of Frank C. Rock, Jr., Ser. No. 293,063, filed June 12, 1952, to prevent the coating material from reaching the surfaces A1 and D2. After the space is thus sealed the coating G may be applied in any suitable way, as disclosed for example in the co-pending application of Donald H. Kelly, Ser. No. 284,410, filed April 25, 1952. After the coating G has been applied the prisms are separated and the masking material 4 is removed by a suitable solvent which dissolves the masking material without adversely affecting the coating G. Since the edge of the mask supports a thin strip of the coating material, removal of the mask permits the projecting coating to break off parallel to the apex of the prism.

Figure 3:
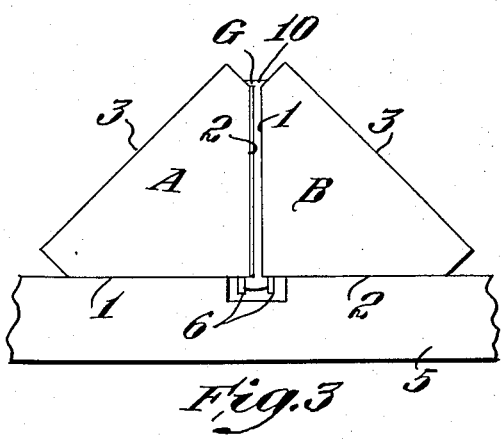
Fig. 3 illustrates the step of cementing one of these coated prisms to one of the uncoated prisms.

The next step is to cement the coated face A2 to the uncoated face B1 and this is preferably accomplished as illustrated in Fig. 3 where 5 illustrates a block whose upper surface is optically flat and contains a groove. Before prisms A and B are placed on the optical flat, Lucite strips 6 are temporarily cemented to their faces A1 and B2 adjacent their apexes. Then the prisms are placed on the flat with their faces A2 and B1 juxtaposed and optical cement 10 is poured into the space between the prisms, and they are pushed together to produce a cement layer of desired thickness, the Lucite strips 6 restricting the spread of the cement over the faces A1 and B2. After the cement has set the pair of prisms is removed from the optical flat 5, the Lucite strips 6 are removed and the protecting ridge of cement is removed flush with the faces A1 and B2.

Figure 4:
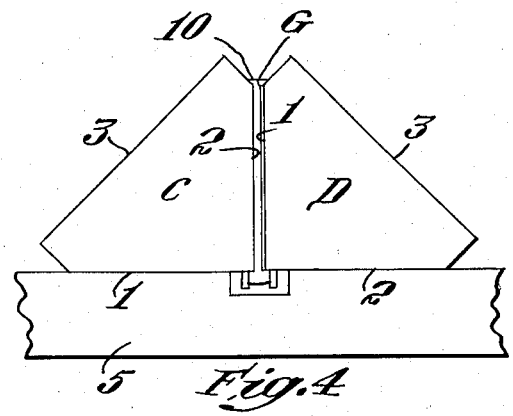
Fig. 4 illustrates the step of cementing the other coated prism to the other uncoated prism.

As illustrated in Fig. 4 the prisms C and D are joined together in the same manner with the first-applied coating G between the two prisms.

Figure 5:
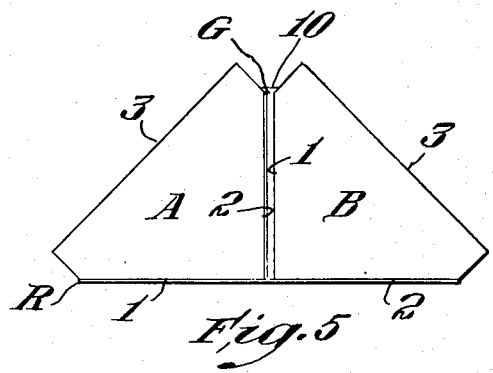
Fig. 5 illustrates the step of coating the exposed faces of one pair of cemented prisms.

After the prisms have been joined together in two pairs as illustrated in Figs. 3 and 4, another coating R is applied to the aligned faces of the prisms of one pair. As illustrated in Fig. 5 the coating R is applied to the faces A1 and B2. This may be accomplished in the same manner as described above in connection with the coating G.

Figure 1:
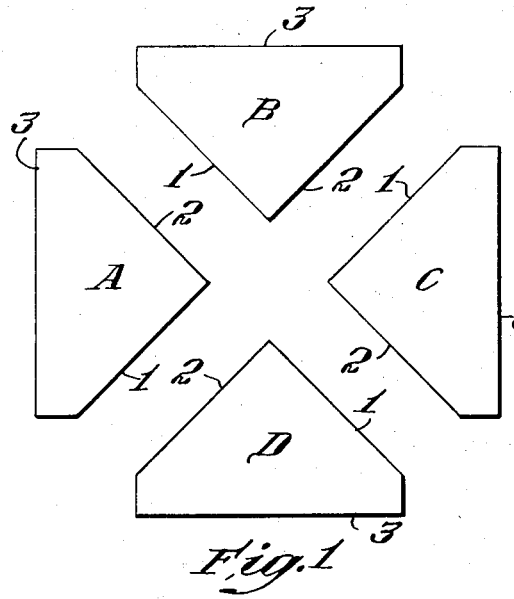
Figure 6:
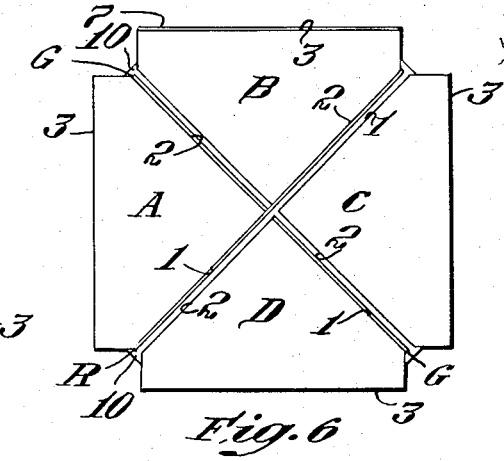
Fig. 6 illustrates the step of cementing the two pairs together with the first coated faces in alignment.

The next step is to cement the two pairs of prisms together with the coatings G between the prisms of the the two pairs in alignment as illustrated in Fig. 6. The two pairs of prisms are squeezed together until the cement layer is reduced to the extreme thinness required. The preferred method of determining the exact adjustment is to coat a metallic reflector 7 on the exposed face 3 of prism B and with an autocollimator project light into the prism C perpendicular to its exposed face 3. Then, by the use of the autocollimator together with microscopes having their axes perpendicular to the exposed faces 3 of the prisms A and D respectively, the pairs of prisms may be adjusted to their proper relative positions in which the two coatings G are in precise alignment and the faces C1 and D2 are parallel to the coating R. After the pairs of prisms are secured together the reflector 7 is removed.

For use in a three-color camera, if the light enters through A the three color components would emerge through prisms B, C and D to three film gates adjacent the three prisms as disclosed in the co-pending application of Marion E. Lynch, Ser. No. 275,865, filed March 11, 1952, now abandoned.

It should be understood that the present disclosure is for the purpose of illustration only and that this invention includes all modifications and equivalents which fall within the scope of the appended claims.

We claim:

1. In making an assembly comprising two triangular prisms cemented together with two of their faces in alignment and two other faces in juxtaposition, the method which comprises placing said first two faces on an optical flat having a groove therein with the other two faces in juxtaposition and in alignment with said groove, pressing the other two faces together with cement therebetween, said groove permitting some of the cement to exude thereinto, causing the cement to set to hold the prisms together, removing the prisms from the flat, and removing any cement which has exuded upon said first two surfaces in said groove.

2. The method according to claim 1 further characterized by cementing barriers on said first two faces adjacent their junctions with the other two faces, the barriers extending into said groove and, after removing the prisms from the flat, removing the barriers together with the cement which has exuded therebetween.

References Cited in the file of this patent

UNITED STATES PATENTS

| | | |
|---|---|---|
| 2,361,514 | Tillyer et al. | Oct. 31, 1914 |
| 2,642,487 | Schroeder | June 16, 1953 |

FOREIGN PATENTS

| | | |
|---|---|---|
| 13,042 | Great Britain | Sept. 11, 1915 |
| 475,415 | Great Britain | Nov. 15, 1937 |

OTHER REFERENCES

Charles Deve: Text on Optical Workshop Principles (Translated by Thomas L. Tippel), 1943, pages 208–211 inclusive.